United States Patent [19]

Miltenberger

[11] 4,213,566
[45] Jul. 22, 1980

[54] NESTED CONE EXTENDIBLE NOZZLE SYSTEM FOR A ROCKET MOTOR

[75] Inventor: Louis E. Miltenberger, Ridgeley, W. Va.

[73] Assignee: Hercules Incorporated, Wilmington, Del.

[21] Appl. No.: 936,995

[22] Filed: Aug. 25, 1978

[51] Int. Cl.² ............................................. B64C 15/06
[52] U.S. Cl. .............................. 239/265.43; 60/242; 60/271
[58] Field of Search ................. 239/265.11, 265.19, 239/265.33, 265.43; 60/242, 271

[56] References Cited

U.S. PATENT DOCUMENTS

| 2,683,961 | 7/1954 | Britton et al. ............ 239/265.33 X |
| 3,183,664 | 5/1965 | Divone ..................... 239/265.33 X |
| 3,270,504 | 9/1966 | Ward ............................ 239/265.33 |
| 3,526,365 | 9/1970 | Paine ........................... 239/265.43 |
| 3,784,109 | 1/1974 | Dueringer .................... 239/265.19 |
| 4,125,224 | 11/1978 | Carey .......................... 239/265.43 |

Primary Examiner—Robert B. Reeves
Assistant Examiner—Andres Kashnikow
Attorney, Agent, or Firm—Michael B. Keehan

[57] ABSTRACT

A nozzle system is provided which comprises a fixed nozzle and a series of movable nozzle cone segments of increasing diameters packaged in a concentric and side-by-side relationship. The movable nozzle cone segments each have aerodynamic drag panels secured to each segment. The drag panels are capable of pulling each nozzle cone segment into a deployed position as the result of impingement of rocket motor combustion gases against the drag panels. With nozzle cone segments in the deployed position, the exhaust area of the nozzle system is greatly increased over the area of the fixed nozzle, resulting in improved performance of the rocket motor.

4 Claims, 19 Drawing Figures

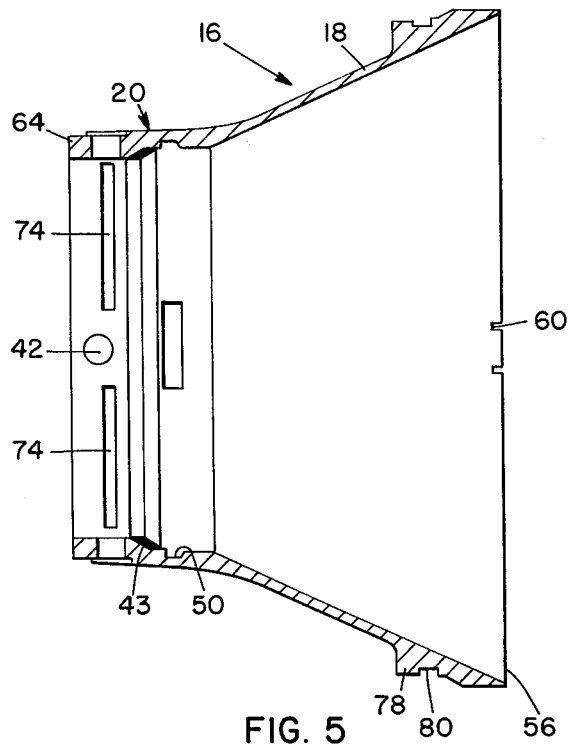
FIG. 5
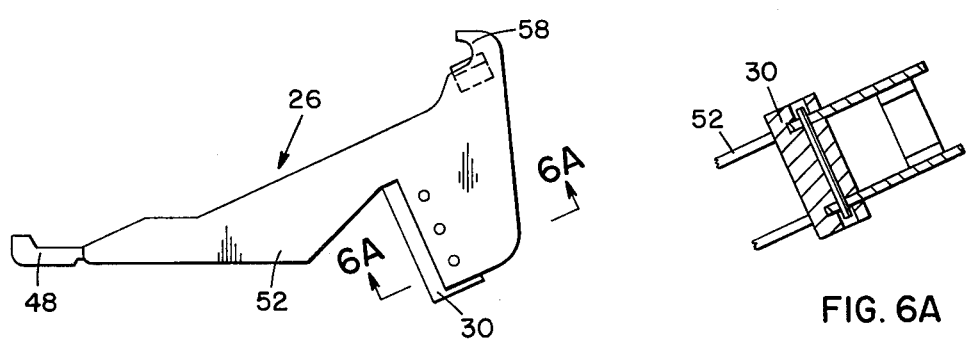
FIG. 6
FIG. 6A

NESTED CONE EXTENDIBLE NOZZLE SYSTEM FOR A ROCKET MOTOR

BACKGROUND OF THE INVENTION

Strategic missile system design studies have shown that significant increases in missile payload or missile range can be achieved by employing packageable high area ratio nozzles on the upper propulsion stages. A packageable nozzle is one which is contained within a limited space envelope defined by the space limitations of the missile system in which the nozzle is to be employed.

A number of attempts have been made to develop a packageable high area ratio nozzle. None of the developments to date have been totally satisfactory due to difficulties in manufacture, high cost and technical difficulties associated with the nozzle design and operation.

SUMMARY OF THE INVENTION

This invention is a packageable high area ratio nozzle referred to hereinafter as a nested cone extendible nozzle system. The system comprises a fixed nozzle and a series of cone segments of increasing diameters, with each cone segment having the same expansion angle as that of the fixed nozzle. The cone segments are moved from a stowed position, in which each cone segment is in a concentric and a side-by-side relationship to the fixed nozzle, to a deployed position in which each cone segment forms part of a continuous extension of the fixed nozzle. In operation, each cone segment is moved, in turn, in an aft direction, until each segment is in a deployed position extending the interior surface of the nozzle and increasing the nozzle expansion area. The fully extended nozzle has a substantially increased nozzle area which is limited by the diametric restraints imposed by stage separation clearances.

An important aspect of this invention is the means by which the cone segments are moved from the stowed position to the deployed position. Each cone segment has at least two and preferably four drag panels connected to the cone segment. Each set of drag panel extends into the theoretical exhaust path of either the fixed nozzle or the cone segment depending upon which part of the nozzle system immediately precedes it in concentric relationship to the fixed nozzle. The force of flowing combustion gases from the rocket motor impinging on the drag panels forces each successive nozzle cone segment into a deployed relationship until all nozzle cone segments are fully deployed.

THE DRAWINGS

This invention is more fully illustrated in the drawings which follow. In the drawings, like numbers refer to like parts where applicable.

FIG. 5 is a side view in cross-section of a nozzle cone segment.

FIG. 6 is a side view of a drag panel. FIG. 6a is a view along lines 6A—6A of FIG. 6 illustrating a drag tab and a hook device on the drag panel.

Figure 8:
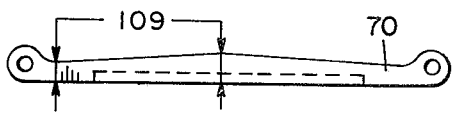
Figure 8A:
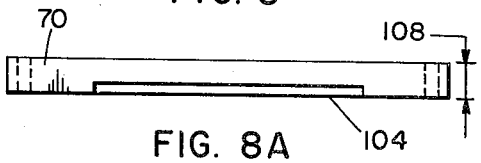
Figure 8C:
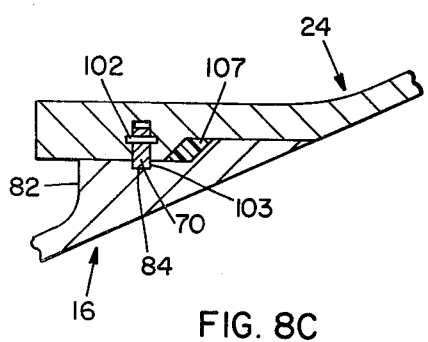
Figure 8B:
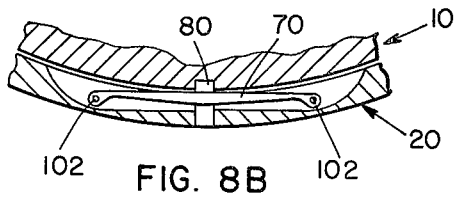

FIG. 8 is a front view of a lock bar. FIG. 8A is a bottom view of the lock bar. FIG. 8B is a partial view in cross-section of the fixed nozzle and a cone segment in a locked and deployed condition, particularly illustrating the lock bar within a slot in a nozzle cone segment. FIG. 8C is a partial cross-sectional view of nozzle cone segments illustrating locked engagement of the cone segments.

Figure 3:
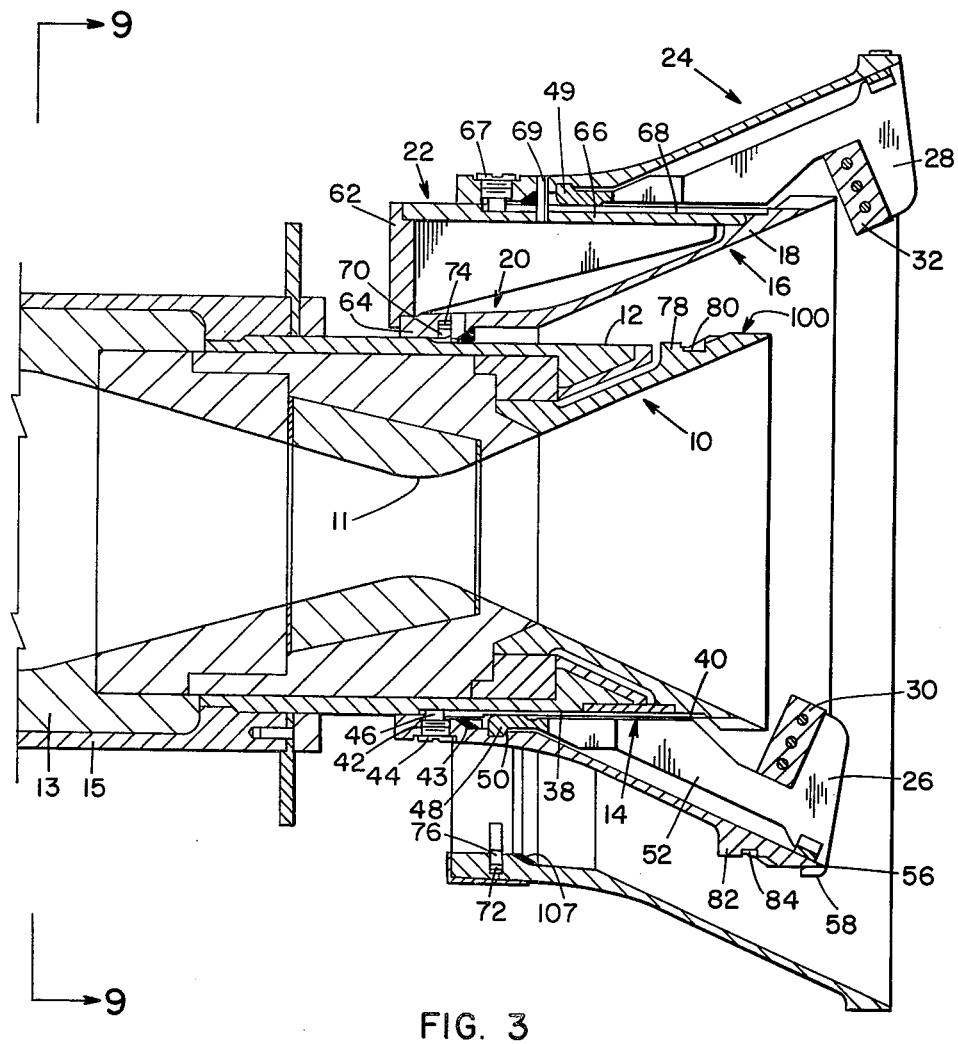
FIG. 3 is a schematic and partial cross-sectional view of the nested cone extendible nozzle system of this invention in the stowed position.
Figure 9:
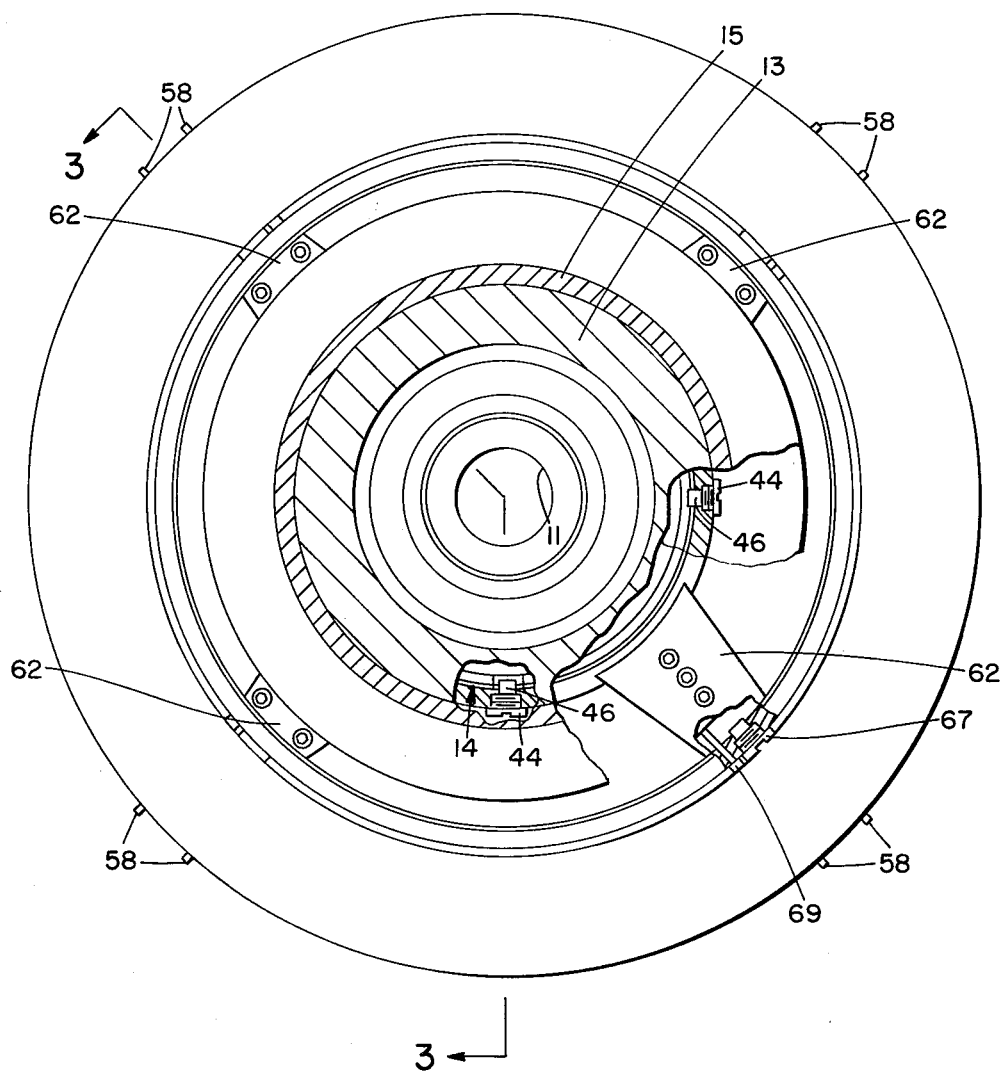

FIG. 9 is a view of the extendible nozzle cone system taken from the forward end of the system along lines 9—9 of FIG. 3 schematically.

Figure 10:
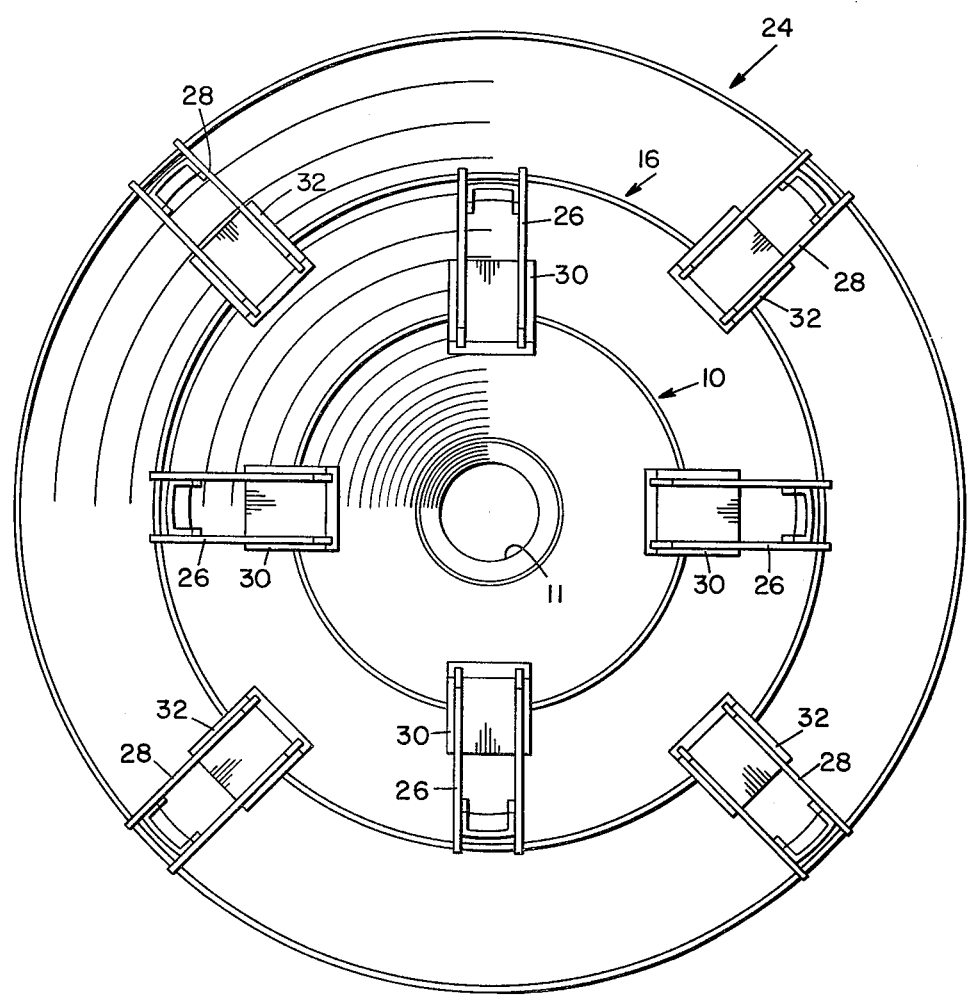

FIG. 10 is an aft-view of the aft-end of the extendible nozzle cone system in the stowed position.

Figure 11:
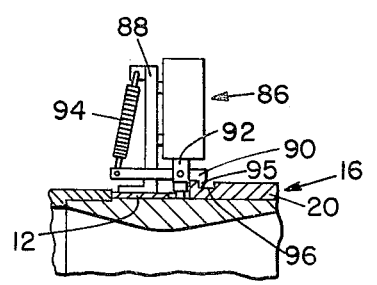

FIG. 11 is a partial side view of the extendible nozzle cone system particularly illustrating the nozzle release mechanism in a closed position.

Figure 12:
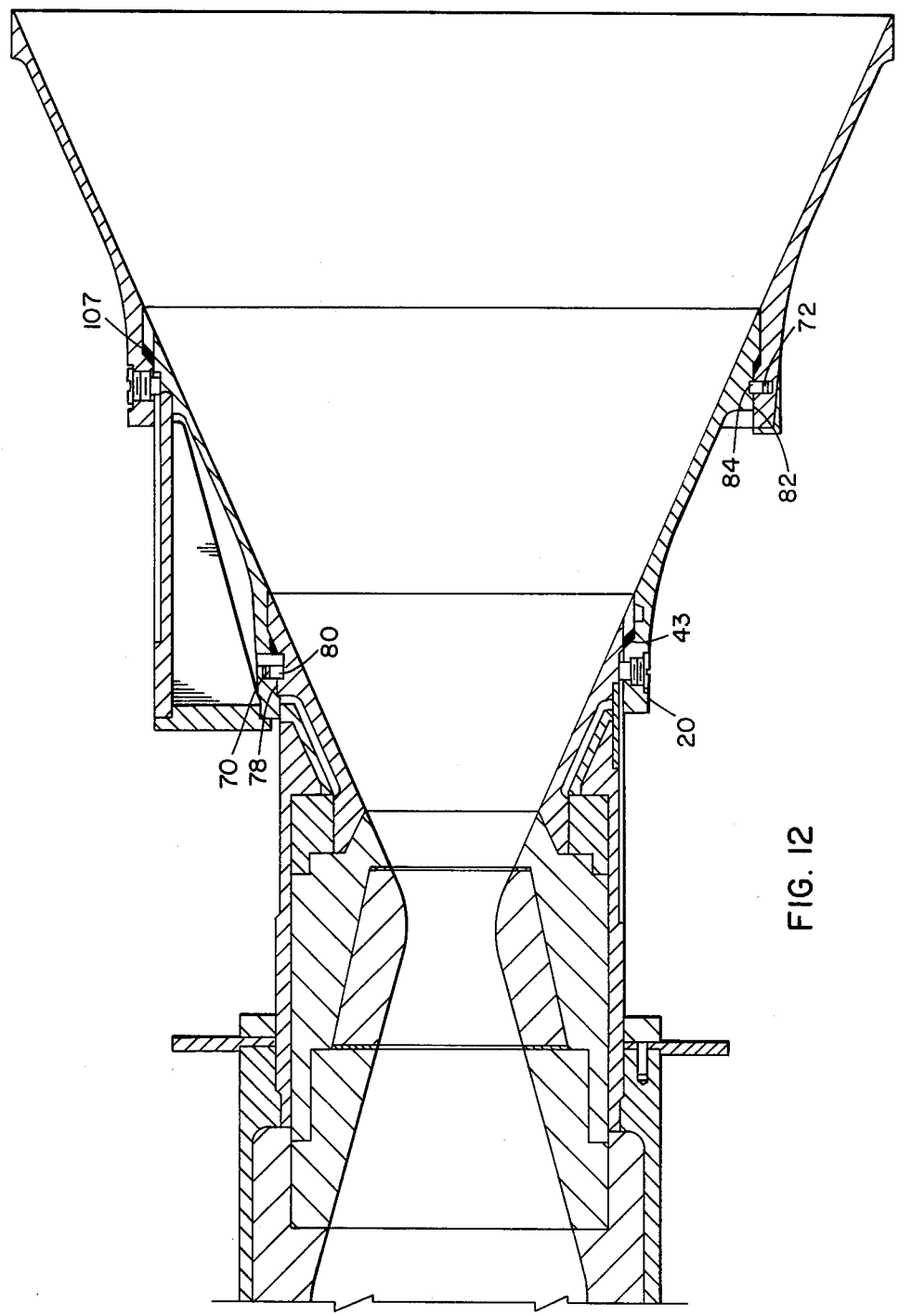

FIG. 12 is a side view of the extendible nozzle cone in deployed position.

DESCRIPTION OF THE PREFERRED EMBODIMENTS

The nested cone extendible nozzle system comprises a fixed nozzle 10 having an outer surface 12 to which are secured fixed rail supports 14. Fixed rail supports 14 are supports and guides for the first extendible nozzle cone segment 16 which extends about and is in a concentric side-by-side spacial relationship to fixed nozzle 10. Extendible nozzle cone segment 16 has a conic section 18 and a cylindrical section 20. The conic section 18 is a truncated cone having a minor diameter slightly greater than the maximum diameter of the fixed nozzle cone 10. The expansion angle of conic section 18 is the same as the expansion angle of fixed nozzle 10. The cylindrical section 20 has a diameter of at least that of the minor diameter of conic section 18. Mounted on the exterior surface of the nozzle cone segment 16 are rail supports 22. A second extendible nozzle cone segment 24 extends about the exterior surface of the first extendible nozzle cone segment 16 in a concentric side-by-side spacial relationship. The second extendible nozzle cone segment 24 is attached to the first extendible nozzle cone segment 16 through adjustable glide buttons 44 engaged in slots rail supports 22 (see FIG. 9). Rail supports 14, 22 in combination with glide button 44, a release latch 90 (FIG. 11) and an interstage shear pin 69 (FIG. 9) maintain the extendible nozzle cone segments in a stowed position or nested position prior to firing of the rocket motor. The extendible nozzle cone assembly is maintained in the stowed position by an electrically actuated latch assembly (FIG. 11) until a deployment signal is given. The two cone segments are held in the interlocked arrangement by the interstage shear pin 69. The shear pin 69 is assembled as a press fit through nozzle cone segment 24 into the rail support 22 as shown in FIG. 9. The shear pin 69 is designed to shear upon impact of the first nozzle cone segment 16 with seating lip 100. Between the fixed nozzle 10 and the first nozzle cone segment 16 are aerodynamic drag panels 26. Between the first nozzle cone segment 16 and second nozzle cone segment 24 is a second set of aerodynamic drag panels 28. Drag panels 26, 28 each have a drag surface 30, 32, respectively, at one end and a connecting tang 48, 49 (see FIGS. 3, 6) at the other end. The drag surfaces of each set of drag panels are positioned so that each drag surface is in the potential exhaust path that is formed when the nozzle cone segment to which the drag panels are attached and the fixed nozzle are in a deployed condition with respect to each other. Thus, drag surfaces 30 extend into the exhaust path of fixed nozzle 10 and drag surfaces 32 extend into the potential exhaust path of the fixed nozzle 10 when extended by the nozzle cone segment 16 being in the deployed position as illustrated in FIG. 2.

Figure 1:
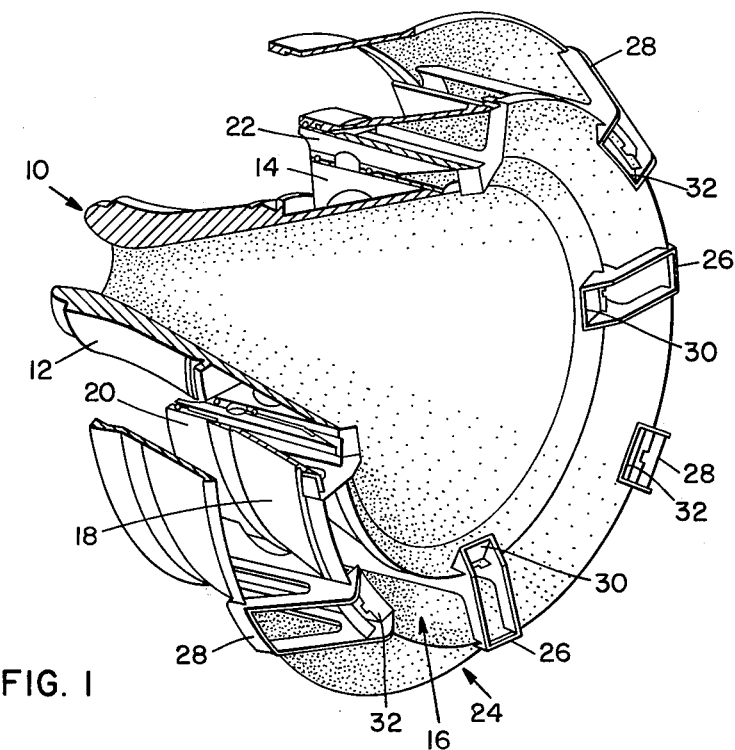
FIG. 1 is a schematic view, partly cut away, illustrating the nested cone extendible nozzle system in the stowed position.
Figure 2:
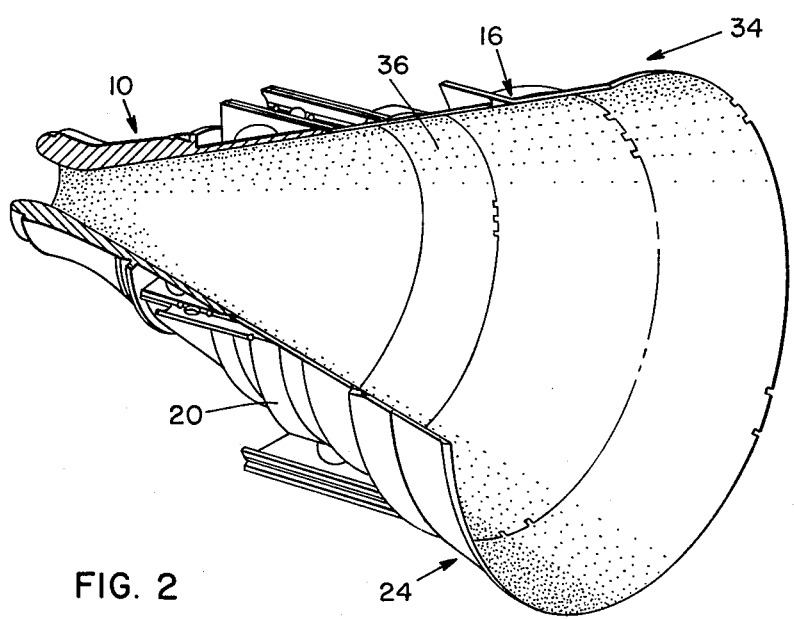
FIG. 2 is a schematic view, partly cut away, of the nested cone extendible nozzle system in the deployed position.

In FIG. 2 the nested cone extendible nozzle system is shown in a fully deployed position 34 in which the nozzle cone segments 16, 24 are shown after they have been moved into deployed position resulting from operation of the rocket motor causing exhaust gases to impinge on the drag panels in the path of the exhaust gases thereby moving the nozzle cone segments aft until they are each in deployed position. The interior surface 36 of the deployed nozzle system of this invention is substantially continuous.

Figure 4:
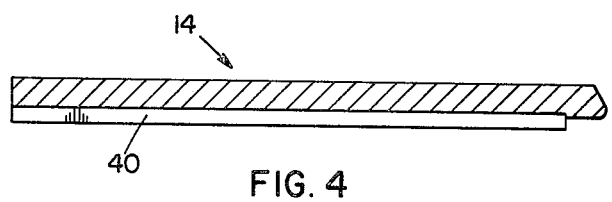
FIG. 4 is a side view in cross-section of a rail support taken along line 4—4 of FIG. 4b.
Figure 4A:
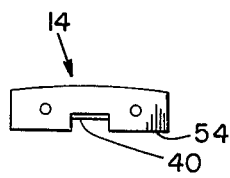
FIGS. 4a and 4b are front and rear views of said rail support, respectively.
Figure 4B:
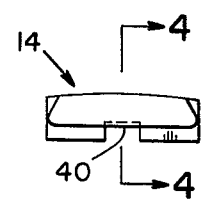

In FIG. 3 the aft end of a rocket motor employing the nozzle system of this invention is schematically illustrated. The fixed nozzle 10 has rail supports 14 (see FIGS. 4, 4a, 4b) secured to the exterior surface 38 of the fixed nozzle 10. Each rail support 14 has a slot 40 extending nearly the entire length of the rail support 14. Nozzle cone segment 16 is in the stowed position in concentric side-by-side relationship to the fixed nozzle 10.

Nozzle cone segment 16 has a series of threaded holes 42 spaced about its cylindrical section 20 (see FIG. 5). Directly forward of the threaded holes 42 is a beveled interior surface on the inside of the cylindrical section 20 of nozzle cone segment 16 against which is fitted a seal 43 which extends around the entire interior circumference of the cone segment. The seal is prepared from high temperature resistant materials such as graphite sheet sold under the trademark "Grafoil" by Union Carbide Corporation. A glide button 44 is threadedly secured in threaded hole 42 and is positioned such that its glide 46 is inserted into slot 40 of rail support 14. While only one rail support 14 is illustrated in FIG. 3, it is to be understood that at least two and preferably four such rail supports, spaced equidistantly from each other about the exterior surface of the nozzle 10 are used in practice to provide support for nozzle cone segment 16 and to ensure nozzle segment alignment control for proper seating of the cone segment 16 in the deployed position.

Drag panel 26 is illustrated in the stowed position between fixed nozzle 10 and nozzle cone segment 16. The drag panel 26 has a tang 48 which is inserted into a tang slot 50 within the cylindrical section 20 of the first nozzle cone segment 16. The drag panel 26 has side brackets 52 (see FIGS. 6, 6(a)) which straddle base 54 of rail support 14. The drag surface 30 of drag panel 26 extends into the theoretical exhaust path of the fixed nozzle 10. Drag surface 30 is attached to side brackets 52 of drag panel 26. Drag panel 26 is supported at the aft edge 56 of nozzle cone segment 16 by insertion of hook member 58 into a slot 60 in the aft edge 56 of nozzle cone segment 16 (see FIGS. 5 and 6).

Figure 7:
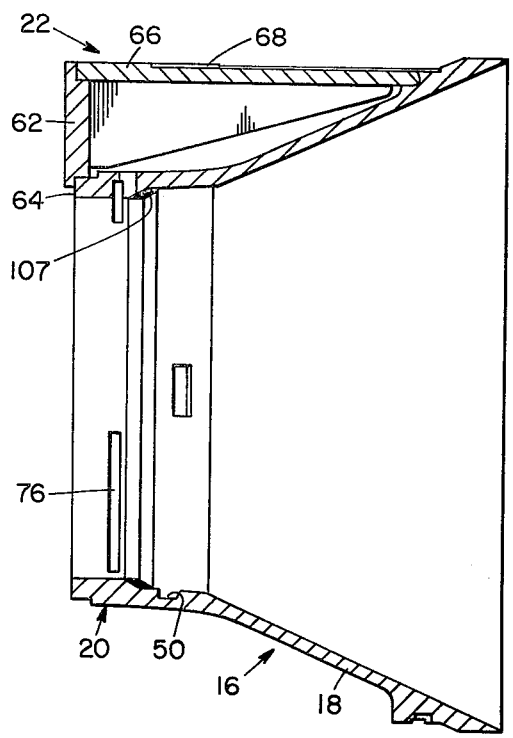
FIG. 7 is a schematic of a support rail attached to nozzle cone segment.
Figure 7A:
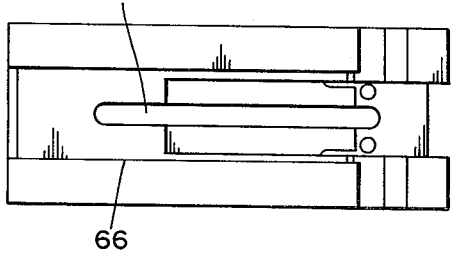
FIG. 7A is a top view of the support rail.

Secured to the exterior surface of nozzle cone segment 16 is the second rail support 22 (see FIG. 7). Second rail support 22 is comprised of a base 62 and a guide rail 66. Base 62 is threadedly secured to the base surface 64 of first nozzle cone segment 16. Guide rail 66 is similar to the first rail support 14 and has a longitudinal slot 68 throughout most of its length. The second nozzle cone segment 24 and drag panels 28 are secured and movable along the second rail support in the same manner as the first nozzle cone segment is secured and movable along rail support 14. While only one second rail support 22 is illustrated in FIGS. 3 and 7, at least two and preferably four rail supports will, in practice, be spaced equidistantly from each other about the exterior surface of each nozzle cone segment in the extendible nozzle system of this invention, except for the outermost nozzle cone segment to be deployed. At the base of the cylindrical section of each movable nozzle cone segment is a seal prepared from any suitable material capable of withstanding the high temperatures of the rocket motor exhaust gas.

In operation of the nozzle system of this invention, each nozzle cone segment starting with the nozzle cone segment closest to the fixed nozzle is forced, in turn, into the deployed position as the result of the force of the rocket exhaust gases impinging against drag surfaces of drag panels which results in movement of the entire nested assembly in the aft direction, along the rail supports until each successive nozzle cone segment is fully deployed. Each nozzle cone segment is held in deployed position by engagement of lock bars, held within slots within the cylindrical sections of each nozzle cone segment, with a mechanism device on the forward exterior surface of the inner adjacent cone segment about which it is positioned. The drag panels are ejected from each extendible nozzle cone segment when each cone segment has moved to its aftmost position. In the aftmost position the drag panel tang slips from locking engagement with the tang slot in the side of the cylindrical section of the nozzle cone segment and is forced out and away from the nozzle by the exhaust gases.

Lock bars 70 and 72 are shown in slots 74 and 76 in nozzle cone segments 16 and 24, respectively (see FIG. 3 and FIGS. 5, 8, 8A, 8B). At the exterior surface of the fixed nozzle 10 and each nozzle cone segment, except for the outermost concentric nozzle cone segment, and in axial alignment with the center of each lock bar of each nozzle cone segment is a catch mechanism comprising a lip 78 and slot 80. When the nozzle cone assembly is moved forward along rail support 14, the forward movement of the assembly forces the lock bar 70 over lip 78 against seal 43 and lock bar 70 snaps into slot 80 locking the nozzle cone segment 16 in the deployed position. This catch system is also used to automatically lock each succeeding nozzle cone segment into the deployed position. Thus, after deployment of nozzle cone segment 16 the second nozzle cone segment 24 is moved forward along rail support 22 as a result of impingement of exhaust gases from the rocket motor on drag surfaces 32 of drag panel 28. Drag panel 28 is jettisoned as the result of the exhaust gases causing a tangential force on the drag panel which pulls the drag panel 28 out of slot 50 which is tapered toward the aft end of nozzle cone segment 16 to permit release of the drag panel when nozzle cone segment 16 has been moved forward into deployed position. Lock bar 72 is forced over lip 82 against seal 107 and lock bar 72 snaps into slot 84 locking the second nozzle cone segment 24 in the deployed position.

The lock bars 70, 72 are designed to meet operational and structural requirements of the extendible nozzle system of this invention. The lock bars 70, 72 are preferably prepared from carbon-carbon composite materials that have excellent high temperature physical properties. The lock bars are attached to nozzle cone segments 16, 24 by two pins 102 (FIG. 8B) per lock bar. Each lock bar length is determined based upon the engagement depth 103 and bearing area required to support the reactive thrust loads applied to the cone segment being locked, taking into account the number of lock bars employed with each cone segment. A chamfered surface 104 is provided to gradually depress the lock bar via a ramp effect as each nozzle cone segment, such as nozzle cone segment 24, is moved over the frontal surface 82 of the inner cone segment, such as nozzle cone segment 16. The lock engages as the lock bar 70 returns to an undeformed condition in the lock engagement groove 84. In this position the cone is prevented from moving further aft by seal 107 and moving forward by the lock bar/engagement groove bearing stress condition.

The bar width 108 is largely determined by the strength required to support the thrust loads applied to the cone segment combined with the torsional rigidity of the lock. The variable height 109 of the bar is designed to minimize flexural stresses within the bar while allowing for maximum torsional rigidity and engagement depth of the locking device.

In FIG. 9 the forward end of the nozzle system of this invention is shown as viewed along line 9—9 of FIG. 3. The nozzle throat 11, nozzle throat insert 13 and rocket motor sidewall 15 are designated as points of reference for this drawing. The first set of guide buttons 44 are threaded in holes 42 in nozzle cone segment 16 and engage slots of rail supports 14 to provide positive orientation of the movable nozzle cone segment before, during and after deployment. The base 62 of second rail support 22 is shown. A second guide button 67 is shown in the broken away view as well as shear pin 69. The shear pin 69 is assembled as a light press fit in a hole that passes through the second nozzle cone segment 24 into the rail support 22. The shear pin 69 is designed with a shear plane that fails upon impact of the first movable nozzle cone segment 16 against lip 100 of the fixed nozzle 10.

In FIG. 10 the nested cone extendible nozzle system of this invention is shown in the stowed position as viewed from the aft-end of the nozzle system. In this illustration, fixed nozzle 10 having a throat 11 has two nozzle cone segments 16, 24 in concentric side-by-side relationship with fixed nozzle 10. Four drag panels 26 are spaced equidistantly about the exterior surface of fixed nozzle 10 and each drag panel is attached (not shown) to the cylindrical section of cone segment 16. Four drag panels 28 are spaced equidistantly about the exterior surface of cone segment 16 and each drag panel 28 is attached (not shown) to the cylindrical section of cone segment 24.

FIG. 11 shows a release mechanism capable of releasing the nested cone extendible nozzle system for deployment upon command. The release mechanism illustrated consists of a straight pull solenoid 86 mounted by bracket 88 to the exterior surface 12 of the fixed nozzle assembly. A latch 90 is attached to the pull rod 92 of the solenoid 86 and is pivoted at and attached to solenoid bracket 88. The free-end of the latch is connected to the solenoid bracket 88 near its upper end by a spring 94 (in tension) which forces the catch-end 95 of latch 90 into locking engagement with a slot 96 in the cylindrical section 20 of the first nozzle cone segment 16. Upon command, pull rod 92 is raised whereby the catch-end 94 of latch 90 is removed from slot 96 and the movable portion of the nozzle cone assembly can then be moved into deployed position upon firing of the rocket motor.

FIG. 12 illustrates the nested cone extendible nozzle system in deployed position. The nozzle sections are each locked in place by lock bars 70, 72 being in locking engagement between the slots 80, 84 and lips 78, 82 of each catch mechanism.

The nested cone extendible nozzle system of this invention can be prepared from any material which will meet the temperature and structural strength requirements for the rocket motor in which the system is employed. The nozzle cone segments are preferably prepared from carbon-carbon composite materials.

What I claim and desire to protect by Letters Patent is:

1. In a rocket motor having a fixed nozzle of the converging-diverging type, the improvement comprising an extendible nozzle cone system comprising:
   (a) at least one movable nozzle cone segment having a cylindrical section and a conic section, each movable nozzle cone segment being positioned in slidable, concentric and side-by-side (stowed) relationship about the exterior surface of the fixed nozzle, said conic section having the same expansion angle as that of the fixed nozzle, said cylindrical section of said movable nozzle segment having at least two slots spaced equidistantly from each other in the interior surface of the cylindrical section,
   (b) at least two rail supports attached to the exterior surface of the rocket motor adjacent the exterior surface of said fixed nozzle, the rail supports being spaced equidistantly from each other and in a parallel relationship with the longitudinal axis of the rocket motor,
   (c) drag panels each having a drag surface, a means for attachment to the movable nozzle cone segment, and being designed for sliding engagement with the rail supports, said drag panels corresponding in number to the number of rail supports and being connected to the movable nozzle cone segment, said drag surface extending into the theoretical exhaust path of said fixed nozzle when said movable nozzle cone segment is in stowed relationship with the fixed nozzle,
   (d) lock means associated with the movable nozzle cone segment for retaining said movable nozzle cone segment in the stowed position and for releasing said movable nozzle cone segment, permitting movement of said movable nozzle cone segment in response to gas flow from said rocket motor impinging on the drag surfaces of said drag panels along the rail supports in the aft direction until the divergent surface of said fixed nozzle is extended as a substantially continuous surface by the conic section of the movable nozzle cone segment (the deployed position), and
   (e) means for retaining the movable nozzle segment in the deployed position.

2. The improved nozzle system of claim 1 in which there are four rail supports and four drag panels.

3. In a rocket motor having a fixed nozzle of the converging-diverging type, the improvement comprising an extendible cone nozzle system comprising:
   (a) a first movable nozzle cone segment having a cylindrical section and a conic section, said first movable nozzle cone segment being positioned in a slidable, concentric and side-by-side (stowed) relationship about the exterior surface of the fixed nozzle, the cylindrical section having slots spaced about the interior surface of said section and the conic section having the same expansion angle as that of the fixed nozzle, (b) a second movable nozzle cone segment having a cylindrical section and a conic section, said second movable nozzle cone segment being positioned in a slidable, concentric and side-by-side (stowed) relationship about the exterior surface of the first movable nozzle cone segment, the cylindrical section having slots spaced about the interior surface of said section and the conic section having the same expansion angle as that of the fixed nozzle, (c) a first set of at least two rail supports attached to the exterior surface of the rocket motor adjacent the exterior surface of the fixed nozzle, said rail supports being spaced equidistantly from each other and in parallel relationship with the longitudinal axis of the rocket motor, (d) a second set of at least two rail supports attached to the exterior surface of the first movable nozzle cone segment, said second set of rail supports being spaced equidistantly from each other and in a parallel relationship with the longitudinal axis of the rocket motor, (e) drag panels each having a drag surface, a means for attachment to the movable nozzle cone segments and being designed for sliding engagement with the rail supports, said drag panels corresponding in number to the number of rail supports and being connected to the first and second movable nozzle cone segments, the drag surfaces of the drag panels connected to the first and second movable nozzle cone segments extending into the theoretical exhaust path of the fixed nozzle and the theoretical exhaust path which can be formed by extension of the fixed nozzle by the conic section of the first movable nozzle cone segment, respectively, (f) lock means associated with the first and second movable nozzle cone segments for retaining said segments in the stowed position and for permitting release of said cone segments whereby said segments can be moved in response to gas flow from said rocket motor impinging on drag surfaces of said drag panels along said rail supports in the aft direction until the divergent surface of said fixed nozzle is extended as a substantially continuous surface by the conic section of the first and second movable nozzle cone segments (the deployed position), and (g) means for retaining said movable nozzle segments in the deployed position.

4. The improved nozzle system of claim 3 in which there are four rail supports about each of the fixed nozzles and the first movable nozzle cone segment and in which there are four drag panels connected to each of the first and second movable nozzle cone segments.

* * * * *